(No Model.)
B. HEINRICH & C. WOOD.
MARINE RECORDING COMPASS.
No. 597,166. Patented Jan. 11, 1898.
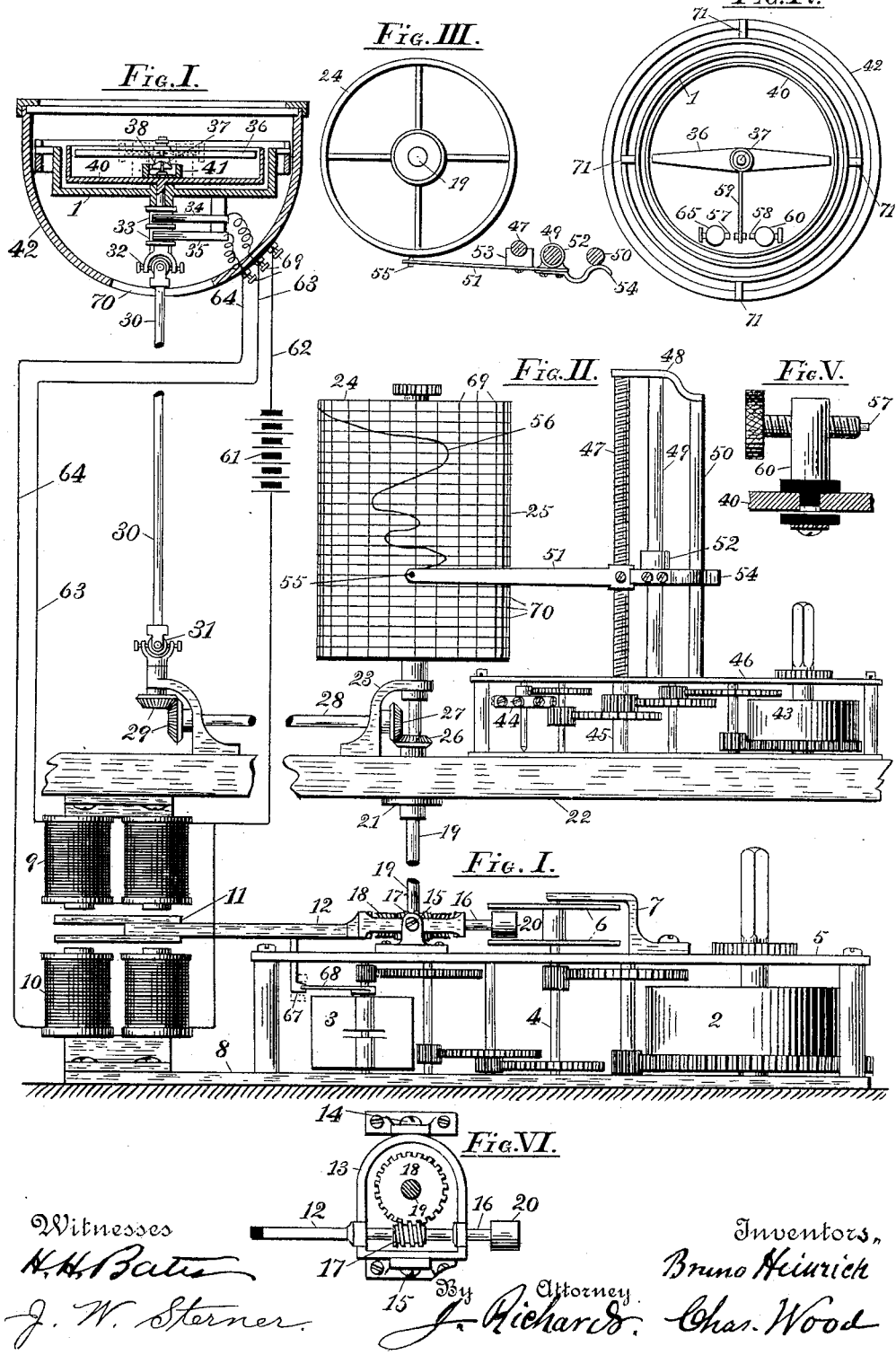

UNITED STATES PATENT OFFICE.

BRUNO HEINRICH AND CHARLES WOOD, OF SAN FRANCISCO, CALIFORNIA.

MARINE RECORDING-COMPASS.

SPECIFICATION forming part of Letters Patent No. 597,166, dated January 11, 1898.

Application filed March 6, 1897. Serial No. 626,310. (No model.)

*To all whom it may concern:*

Be it known that we, BRUNO HEINRICH and CHARLES WOOD, citizens of the United States, and residents of the city and county of San Francisco, State of California, have invented certain new and useful Improvements in Marine Recording-Compasses, of which the following is a specification.

Our invention relates to mariners' compasses and to mechanism and devices to automatically indicate and record the course of a vessel thereby throughout a voyage or any part thereof.

Our invention, stated in general terms, consists in a marine recording-compass which by means of electric devices, clockwork, and other mechanism retains a chart which is traversed by a marking-point driven by clockwork in a true north and south position in relation to the earth's magnetic poles, regardless of the motion and direction of the ship, bearing the same relation to the ship as the compass-needle, thus recording on the chart the true course sailed by a ship in a given time. The compass needle or disk is mounted in a separate adjustable case or support and is provided with a delicate spring, acting as a conductor for an electric current. This compass case or support is fastened to a perpendicular spindle which extends through the bottom of the outer compass-shell and connects to a gear-wheel, which may be driven to the right or left by means of clockwork or other suitable means. The compass case or support is provided with double electric contacting devices that offer two paths for an electric current. These contact-points are set on each side of a delicate spring on the compass-needle, so that when in normal position the spring makes no electric connection to one or the other of the contact-points; but if the case or compass-support moves with the ship out of its true north and south position the compass needle or disk remaining north and south will close one of the circuits by means of the contacting spring, which in turn closes an electric circuit, actuating an electromagnet thereby and setting in operation a clockwork, turning the case or compass-support in such direction as to make the contact-point through which the current now flows recede from the spring until the circuit is opened. Then the electromagnet will release the armature, thereby arresting the clockwork, stopping further motion. A motion of the ship in the opposite direction will make connection of the other contact-point and cause the case or compass-support to revolve in the opposite direction until the circuit is opened again, this compass-support following the compass needle or disk by a movement technically called an "overtake" one.

To the shaft that turns and adjusts the contacting devices to the compass-needle is geared a drum, also maintained in a fixed position in relation to the north and south poles. On this drum is placed a chart, traversed by a marking-point moved by a time-clock, and having a fixed position in relation to the ship, but is driven in vertical direction by means of the clock. The chart remaining in a fixed north and south position and the marking-point having a fixed position in relation to the ship will mark or record the course sailed by the vessel with relation to time.

Referring to the drawings herewith, illustrating the method of applying our invention, and forming a part of this specification, Figure I is a vertical section through a common mariner's compass fitted with our improvements and in side elevation the mechanism to revolve the compass-case. Fig. II is a side view of the time-clockwork and the marking or recording mechanism. Fig. III is a partial plan view of the construction in Fig. II. Fig. IV is a plan view of the compass, showing the needle and electric contacting devices. Fig. V is an enlarged side view of one of the electric contacting devices. Fig. VI is a plan view of a portion of the gearing to operate the recording-drum and chart thereon.

Similar numerals of reference indicate corresponding parts.

The actuating mechanism for the compass case or support 1 consists, preferably, of a strong coil-spring and drum 2, connected by the wheel-train of multiplying-gearing to the retarding-fan 3 in the usual manner of such driving-clockwork. The axis 4 of the second mover in the wheel train passes up through the top plate 5 and is provided with two disks 6 and supported above by a bracket 7.

On the bottom plate 8 of the clockwork or in any suitable manner are fastened the electromagnets 9 and 10, between which is an armature 11 on the oscillating stem 12, integral with or attached to the frame 13, supported on pivots 14 and 15.

In the frame 13 is mounted a spindle 16, having thereon a screw-pinion 17, meshing into the tangent-wheel 18 on the spindle 19. On the end of the spindle 16 is a friction-wheel 20, engaged by the disks 6 when pressed against one or the other by action of the armature 11 and the stem 12, the motion of the friction-wheel 17 and the spindle 16 being to the right or left accordingly. In this manner the spindle 19 partakes of the motion of the spindle 16 at a slow rate or as the number of teeth in the tangent-wheel 18 are to the revolutions of the spindle 16.

The spindle 19, as seen in Fig. II, extends through a bearing 21 and the bar or frame 22, the bracket 23, and has fixed to its top the revoluble drum 24, on which is wrapped a paper chart 25. Above the bar or frame 22 the spindle 19 is geared by the wheels 26 27 to the horizontal spindle 28, and this spindle is geared by the wheels 29 to the vertical spindle 30, provided with gimbal-joints 31 32, and is attached to the adjustable plate 40 in the compass-case 1. The gimbal or universal joints 31 32 permit the plate 40 on the spindle 30 to keep its position in respect to the compass case and needle irrespective of motions of the ship and other elements fixed thereto. On the upper section of this spindle 30 are collector-rings 33 and brushes 34 35 for electric conduction, as hereinafter described.

The compass-needle 36 is poised on a pivot 37, surrounded by a shroud or bell 38, that dips into a cup 41 on the movable member 40 of the compass case or frame. This cup 41, being filled with mercury, forms by the shroud 38 an electric connection between the needle 36 and the compass case or support 1, the movable plate 40, and the outer case 42.

Reverting now to the time-clock gearing and recording devices shown in Figs. II and III, 43 is a drum-spring connecting by the usual train of gearing to a common oscillating escapement 44. The axis 45 of the fourth mover in the wheel-train extends up through the plate 46 and continues as a screw 47, supported at the top in a bracket 48. Parallel with the screw 47 are standards 49 50, the center one 49 answering as a guide for the marking-stem 51 by means of the sliding sleeve 52. On the inside of the stem 51 is fastened a half-nut 53, that engages the screw 47, and the end of this stem 51 is a spring 54, that bears against the standard 50, so the stem 51 when free will press a pencil or marking-point 55 against the chart 25, as seen in Fig. III, the spring 54 permitting the stem 51 to be drawn back to disengage the nut 55, so this stem can be adjusted upward or downward to the local time 56 on the chart 25. These electrodes or contact-points 57 58 are adjustably mounted in the posts 60 65, fastened to but insulated from the adjustable member or plate 40 of the compass, as seen in Fig. V.

The wire 62 leads from the magnets 9 and 10 to the case 42, and there is electrical connection between said case and the needle 36 through the cup 41 and shroud 38, the cup 41 being filled with mercury and borne on the plate 40, which is insulated from the contact-points mounted in the posts 60 65, as explained above.

The wire 63 connects from the electromagnet 9 to the brush 34, which forms a constant electrical contact with the uppermost collector-ring 33, supported on shaft 30 above the gimbal-joint 32, the same being in electrical connection with the contact-point 57, but insulated from contact-point 58. The wire 64 connects from the electromagnet 10 to the brush 35, which forms a constant electrical contact with the lowermost collector-ring 33 on shaft 30, the same being in electrical connection with contact-point 58, but insulated from contact-point 57, so the electromagnets 9 and 10 are energized accordingly as the spring 59 touches the contacts 57 58, opening and closing the two circuits 63 64, so the armature 11 is drawn upward or downward accordingly.

The adjustable member 40, being borne on the vertical spindle 30, partakes of the movements of the latter back and forth as actuated by the shaft 28 and gears 29, rotated backward or forward by the friction-wheel 20 accordingly as the latter is influenced by the action of the electromagnets 9 and 10 in conjunction with the clockwork mechanism. Since this member 40 carries the contact-points 57 58, as hereinafter specified, it is readily seen that its movements backward or forward will take place in conformity with the contacts of the said contact-points with the relatively-fixed arm 57, attached to the magnetic needle 36, which maintains an approximately north and south position.

To the bottom of the armature-bar 12 is attached a stop 67, which engages an arm or vane 68 on the spindle of the fan 3, so that when the armature 11 is central, as seen in Fig. I, the fan 3 is locked, but when the armature moves upward or downward the stop 67 is raised above or depressed below the arm 68, as shown by dotted lines. The fan 3 is released, so the wheel-train and connected gearing are set in motion.

The wires 62 63 64 are all fastened by binding-posts 69 to the fixed outer case 42, and the bottom of the latter is cut away at 70, so as to clear the spindle 30 and permit free action of the gimbal-bearings 71 and the compass-case 1 to remain level irrespective of the motions of the ship and of the main outer case 42.

The operation is as follows: Supposing the time-clock in Fig. II to be going and the pointer 55 moving downward over the chart 25. If the vessel is moving in a direct line, the spring 59 remains clear of the contacts 57 58, the armature 11 is in its central or neutral position, and the drum 24 locked. Then the point 55 will trace a straight vertical line on the chart 25. If the ship veers either way, the needle 36 remains north and south and one of the contacts 57 or 58 will touch the spring 59, closing one or the other of the circuits 63 64, thereby energizing one of the electromagnets 9 or 10, moves the armature 11 upward or downward accordingly, setting the fan 3 and the spindles 16, 19, and 30 in motion, turning the drum 24 and the chart accordingly, also turning the plate 40 in a direction causing the points 57 or 58 to recede from the spring 59 in the direction of the contact until the circuit is opened. Then the armature 11 will stop motion of the spindles 19 and 30 until there is further contact, the points 57 58 receding all the time from the spring 59 by an overtake movement either way as the ship may be veering, the drum 24 and the chart 25 turning to the right or left accordingly, and the point 55, tracing a line 56, showing graphically the ship's course in respect to time.

The chart 25 on the drum 24 is divided vertically into twenty-four divisions 70, representing the hours in a day, and is divided circumferentially into thirty-two divisions 69, representing the points of a compass, so a line 56 traced on the chart will be defined in respect to time and course.

The charts 25 when removed from the drum 24 can be filed and will show the course of the ship as steered by its compass during any period of time for which the chart 25 and movement of the time-clock have been arranged.

Having thus explained the nature and objects of our invention, what we claim as new, and desire to secure by Letters Patent, is—

1. In a recording marine compass, the bowl-shaped outer supporting-case, the pivotally-mounted compass-case within the said outer case, the vertical shaft 30, with means for rotating the same in either direction, the circular dish-shaped member 40, borne on the said vertical shaft, the electrical contact-points 57, 58, borne on said member 40, the magnetic needle pivoted freely within and above the said member 40, and a contact-arm attached to the said needle, playing between the said contact-points, and making electrical contact alternately therewith as the said member 40 is rotated relatively to the needle to the right or left, substantially as specified.

2. In a recording marine compass, a pivotally-mounted compass-case, a magnetic needle pivoted freely within the said compass-case, a revoluble dish-shaped member mounted below the said needle and rotating independently thereof in either direction, electrical contact-points borne on the said revoluble member, insulated from each other, an arm attached to the said needle playing between the said contact-points, an electric circuit through said needle-arm and each of said contact-points with electromagnets in circuit, adapted to be energized accordingly as the contact is made with one or the other of the contact-points respectively, and clockwork mechanism for rotating the said revoluble member bearing the contact-points in either direction accordingly as it is influenced by the said electromagnets and connecting mechanism, substantially as specified.

3. In a recording marine compass, a compass-case, fixed in respect to the ship, a magnetic needle freely poised therein, a revoluble dish-shaped member mounted below the said needle and rotating independently of the same, a vertical spindle supporting the said member and capable of being rotated in either direction, electric contact-points borne on the said revoluble member, a contacting arm playing freely between said points and carried by the said magnetic needle, an electric circuit with an electromagnet in circuit through the said contacting arm and each of said contacting points, adapted to energize said electromagnets accordingly as the contact is made with one or the other of the said contacting points, a clockwork mechanism for rotating the said vertical spindle and revoluble member in either direction as governed by the said electromagnets, and a rotary chart, adapted to be revolved in either direction by the same mechanism that rotates the vertical spindle, and controlled by the same means, substantially as specified.

4. In a recording marine compass, a compass-case, a magnetic needle freely poised therein, a revoluble member 40 beneath said needle supported by vertical spindle 30, and carrying electrical contact-points, a contacting arm carried by said needle and playing between the said contact-points, an electrical circuit with an electromagnet in circuit through said contacting arm and each of said contacting points, a clockwork mechanism for rotating said vertical spindle and revoluble member in either direction, with means for controlling the direction, automatically controlled by the said electromagnets accordingly as the circuit is completed through one or the other of the said contacting points, a rotary chart, revoluble in either direction in unison with the movements of the revoluble spindle 30 and member 40, and a marking-point traversing the said rotary chart at a uniform rate parallel with the axis thereof as moved by independent mechanism, whereby a record of the course of the vessel is made upon the said chart, substantially as specified.

5. In a recording marine compass, a bowl-shaped compass-case, a magnetic needle freely poised therein, a revoluble member 40 beneath said needle, a vertical spindle 30 supporting said revoluble member, contacting points 57, 58, borne on said member 40, a contacting arm carried by said needle playing between said contacting points, collector-rings 33 borne on said vertical spindle, brush collectors 34, 35, making contact with said collector-rings, an electric circuit with an electromagnet in circuit through said contacting arm and each of said contacting points and brush collectors and collector-rings, a clockwork mechanism for rotating said vertical spindle and revoluble member in either direction, with means for automatically controlling the direction accordingly as one or the other of the electromagnets in the electric circuits is energized, a chart borne on the surface of a rotary cylinder, rotated in either direction in unison with the movements of the said vertical spindle, and a marker, traversing said chart at a uniform speed in a right line parallel with the axis of the rotating cylinder, whereby by the combined movements of the chart and marker a line is automatically traced on the chart indicating the true course of the vessel, substantially as specified.

In testimony whereof we have hereunto affixed our signatures in the presence of witnesses.

BRUNO HEINRICH.
CHARLES WOOD.

Witnesses:
H. SANDERSON,
JAMES L. KING.